United States Patent
Litterscheid et al.

(10) Patent No.: US 9,091,318 B2
(45) Date of Patent: Jul. 28, 2015

(54) VIBRATION DAMPER WITH FREQUENCY-SELECTIVE DAMPING FORCE

(71) Applicants: Dirk Litterscheid, Eitorf (DE); Johannes Hoof, Wiehl (DE); Reinhard Sonnenburg, Burkardroth (DE)

(72) Inventors: Dirk Litterscheid, Eitorf (DE); Johannes Hoof, Wiehl (DE); Reinhard Sonnenburg, Burkardroth (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 66 days.

(21) Appl. No.: 13/946,274

(22) Filed: Jul. 19, 2013

(65) Prior Publication Data
US 2014/0020996 A1    Jan. 23, 2014

(30) Foreign Application Priority Data

Jul. 19, 2012   (DE) .......................... 10 2012 212 684

(51) Int. Cl.
*F16F 9/26* (2006.01)
*F16F 9/512* (2006.01)

(52) U.S. Cl.
CPC ................. *F16F 9/26* (2013.01); *F16F 9/5126* (2013.01)

(58) Field of Classification Search
CPC ................. F16F 9/16; F16F 9/22; F16F 9/26; F16F 9/486; F16F 9/3221
USPC .................. 188/280, 304, 283, 284, 297, 312
See application file for complete search history.

(56) References Cited

U.S. PATENT DOCUMENTS

| | | | | |
|---|---|---|---|---|
| 1,150,925 A | * | 8/1915 | Brennen ........................ | 188/284 |
| 3,175,645 A | * | 3/1965 | Schafer et al. ............. | 188/282.6 |
| 3,944,197 A | * | 3/1976 | Dachicourt ................ | 267/64.23 |
| 4,635,766 A | * | 1/1987 | Street, Jr. ...................... | 188/284 |

FOREIGN PATENT DOCUMENTS

| | | | |
|---|---|---|---|
| DE | 3131201 | | 11/1983 |
| DE | 3901256 A1 | * | 8/1989 |
| DE | 102008002062 | | 11/2009 |
| DE | 102009016453 | | 10/2010 |
| GB | 1124357 A | * | 8/1968 |

* cited by examiner

*Primary Examiner* — Thomas J Williams
(74) *Attorney, Agent, or Firm* — Cozen O'Connor

(57) ABSTRACT

A vibration damper includes a piston rod which is axially movable in a cylinder and at which is arranged a housing in which an auxiliary piston is axially movably supported, wherein the auxiliary piston is connected to a piston rod portion at which a main piston is arranged, wherein the auxiliary piston and the main piston are outfitted with damping valves which generate a damping force for both movement directions of the piston rod and piston rod portion, wherein the main piston divides the cylinder into a working chamber on the piston rod side and a working chamber remote of the piston rod, both of which working chambers are filled with damping medium, and the auxiliary piston divides the housing into two auxiliary chambers, wherein the auxiliary piston generates a damping force over its entire stroke path, which damping force is always greater than the damping force of the main piston at an identical stroke speed.

5 Claims, 3 Drawing Sheets

VIBRATION DAMPER WITH FREQUENCY-SELECTIVE DAMPING FORCE

BACKGROUND OF THE INVENTION

1. Field of the Invention

The invention is directed to a vibration damper with a frequency-selective damping force including an axially movable piston rod, a housing including an auxiliary piston and a main piston.

2. Description of the Related Art

A vibration damper with amplitude-dependent damping force is known from DE 10 2008 002 062 B3. In the embodiment of FIG. 1, a main piston is connected by a piston rod portion to an auxiliary piston inside a housing which is in turn fixed to a piston rod. With a connection channel inside a wall, the auxiliary piston forms a throttle valve. When the auxiliary piston is situated between the two connection channels, the main piston can be moved relative to the piston rod by a comparatively slight force because the damping medium located in the housing can be displaced from the housing via the connection channels. The main piston only generates a greater damping force as the auxiliary piston increasingly closes a connection channel.

In FIG. 2, the auxiliary piston additionally has damping valves which generate a damping force when the auxiliary piston closes a connection channel and is further displaced in direction of the end of the housing. Also, in this variant the main piston generates the substantial proportion of damping force. The auxiliary piston does not generate any damping force at all in a defined range and first assumes a kind of hydraulic pressure impact function at the end of the stroke. Therefore, this vibration damper also has an amplitude-selective damping force function.

In vibration dampers with a highly degressive damping force characteristic, piston rod vibrations which are perceived as knocking noises can occur during high frequency excitation of the vibration damper. In this regard, DE 10 2009 016 453 A1 suggests tuning a piston rod bearing support to a determined damping force. Unfortunately, this construction principle only functions at a single frequency but is not satisfactory over a greater frequency range.

It is thus an object of the present invention to provide a vibration damper in which unwanted piston rod vibrations are suppressed also at high frequency excitations.

SUMMARY OF THE INVENTION

According to the invention, this object is met in that the auxiliary piston generates a damping force over its entire stroke path, which damping force is always greater than the damping force of the main piston at an identical stroke speed.

Through the combination of the auxiliary piston and the main piston, two vibration dampers integrated one inside the other are always available in practice. The auxiliary piston acts particularly during high frequency vibrations when correspondingly high excitations occur at the main piston which are reduced by the interposed auxiliary piston.

It is provided in a further advantageous embodiment that a damping force characteristic of the auxiliary piston shows the same qualitative behavior as the damping force characteristic of the main piston. Both damping force characteristic curves can be checked very easily individually in the finished product so that the desired operating behavior is achieved when the two damping force characteristic curves of the main piston and auxiliary piston functionally overlap.

In one embodiment, the piston rod portion has an extension which extends from the auxiliary piston to an end limiting wall of the auxiliary chamber in every stroke position of the auxiliary piston.

According to an advantageous embodiment, the auxiliary chamber is adjoined by a receiving space for a stroke path of the extension.

To avoid the occurrence of peak positive pressure and peak negative pressure, the receiving space has a pressure compensation opening at a working chamber.

Optionally, an impact spring is associated with the auxiliary piston. The impact spring prevents impact noise of the auxiliary piston in the housing under all conditions.

With respect to a defined position of the auxiliary piston within the housing, the impact spring preloads the auxiliary piston to an initial position in the housing Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described more fully with reference to the following description of the drawings in which.

DETAILED DESCRIPTION OF THE PRESENTLY PREFERRED EMBODIMENTS

Figure 1:
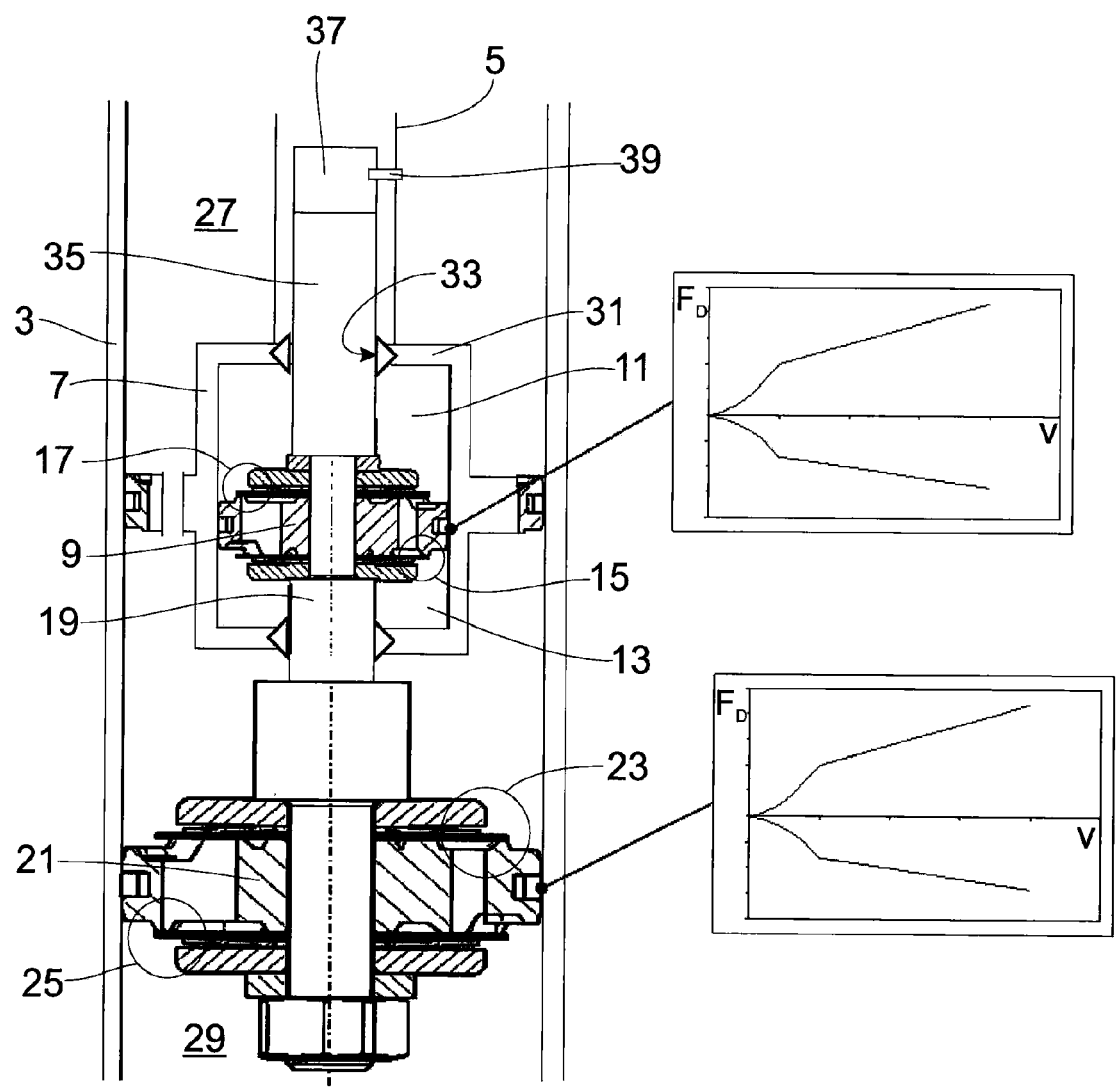
FIG. 1 is a sectional view of a vibration damper in the region of a housing on the piston rod side.

FIG. 1 shows a section from a vibration damper 1 having a cylinder 3 in which a piston rod 5 is axially movably guided. The piston rod 5 carries a housing 7 which is divided by an auxiliary piston 9 into two auxiliary chambers 11; 13 which are completely filled with a damping medium. Damping valves 15; 17 are arranged at the auxiliary piston 9 for both axial movement directions of the auxiliary piston 9. Further, the auxiliary piston 9 comprises a piston rod portion 19 at which a main piston 21 is arranged outside the housing 7. The main piston 21 likewise has damping valves 23; 25 for both axial movement directions of the main piston 21 and piston rod 5. The damping valves 15; 17; 23; 25 at the auxiliary piston 9 and at the main piston 21 are adapted to one another such that, at the same stroke speed, the damping force at the auxiliary piston 9 is always greater than the damping force at the main piston 21. Qualitatively, both damping valve groups can have the same qualitative damping force characteristic.

The main piston 21 divides the cylinder 3 into a working chamber 27 on the piston rod side and a working chamber 29 remote of the piston rod, both of which working chambers 27; 29 are completely filled with damping medium.

The housing 7 is completely closed in the region of a stroke path of the auxiliary piston 9. A limiting wall 31 of the auxiliary chamber 11 in the housing 7 has a through-hole 33 for an extension 35 of the auxiliary piston 9 connecting a receiving space 37 with that of the auxiliary piston 9. The extension 35 is so dimensioned in length that it projects into the receiving space 37 in every stroke position of the auxiliary piston 9. Further, the diameter of the extension 35 corresponds to the piston rod portion 19 between the main piston 21 and the auxiliary piston 9.

The receiving space 37 has a pressure compensation opening 39 toward the working chamber 27 on the piston rod side in order to prevent a pressure cushion in the receiving space 37.

In case of excitation of the vibration damper 1 which, e.g., leads to a compression of the working chamber 29 remote of the piston rod, damping medium is displaced from this working chamber 29 through the damping valve 23 in the main piston 21. The main piston 21 is supported at the auxiliary piston 9 by the piston rod portion 19. However, owing to the fact that the damping force characteristic curve of the auxiliary piston 9 is designed for a greater damping force compared to the main piston 21, the damping force at the main piston does not necessarily lead to a displacement of the auxiliary piston 9 in the housing 7. The main piston 21 and the piston rod 5 then move synchronously in the extreme case. In reality, small excitation frequencies often occur with larger movements of the piston rod which are in turn absorbed by smaller damping forces. No knocking noises occur at lower piston rod speeds or frequencies.

However, if the excitation exceeds a defined frequency, the damping force also increases at the main piston 21 and must in turn be supported by a damping force at the auxiliary piston 9 as reaction force. The auxiliary piston 9 then moves in the housing 7 in direction of the limiting wall 21 and generates a damping force. In so doing, the main piston 21 moves in a compulsory manner relative to the cylinder 3 on the one hand but also relative to the piston rod 5. The greater the damping force at the auxiliary piston 9, the greater also the relative speed between the main piston 21 and piston rod 5. Functionally, two vibration dampers then act in series. Trials have demonstrated that the high frequency main piston movements can be isolated in this way from the piston rod 5 thereby preventing knocking noise.

The same manner of operation also occurs when the piston rod 5 moves out and the working chamber 27 on the piston rod side is compressed by the main piston 21. When this happens, the depth to which the extension 35 moves into the receiving space 37 is reduced, but the damping medium volume is pumped by the damping valve 15 out of the auxiliary chamber 13 which faces in direction of the main piston 21 into the auxiliary chamber 11 which faces in direction of the piston rod 5. Since the two auxiliary chambers 11; 13 change in volume in exactly the same measure in opposite directions, the housing 7 can be constructed so as to be closed in the region of the stroke path of the auxiliary piston 9.

Figure 2:
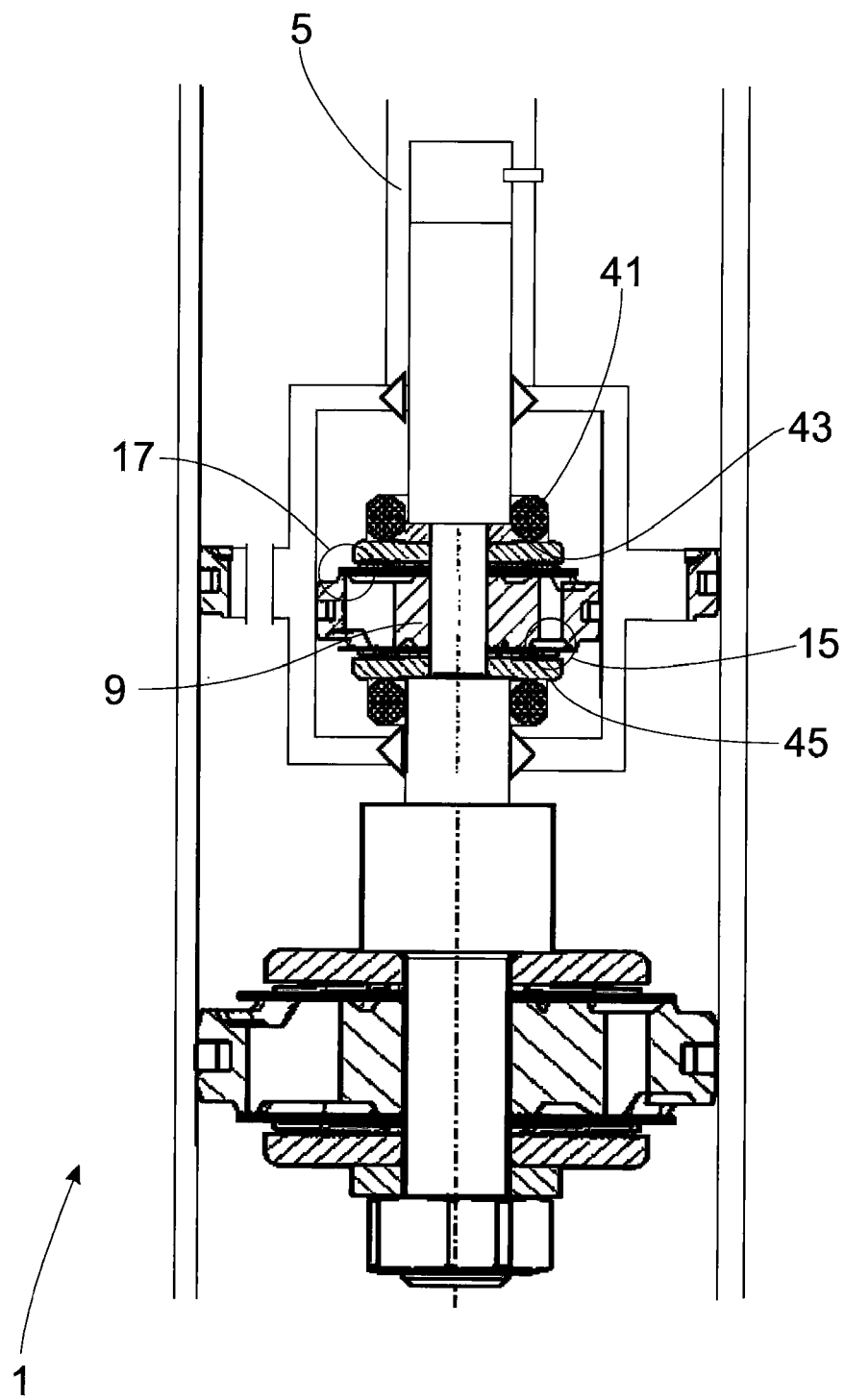
FIG. 2 is a variant of FIG. 1 with impact spring.

The construction according to FIG. 2 is based on FIG. 1. Additionally, at least one impact spring 41 is associated with the auxiliary piston 9. For example, the impact spring in FIG. 2 is constructed as an elastomeric ring which is supported in each instance at a supporting surface 43; 45 for the damping valves 15; 17 at the auxiliary piston 9. If it should happen that an extremely high relative speed occurs between the auxiliary piston 9 and piston rod 5 over a larger stroke path of the auxiliary piston 9, an impact noise can be cushioned by the elastomeric ring 41.

Figure 3:
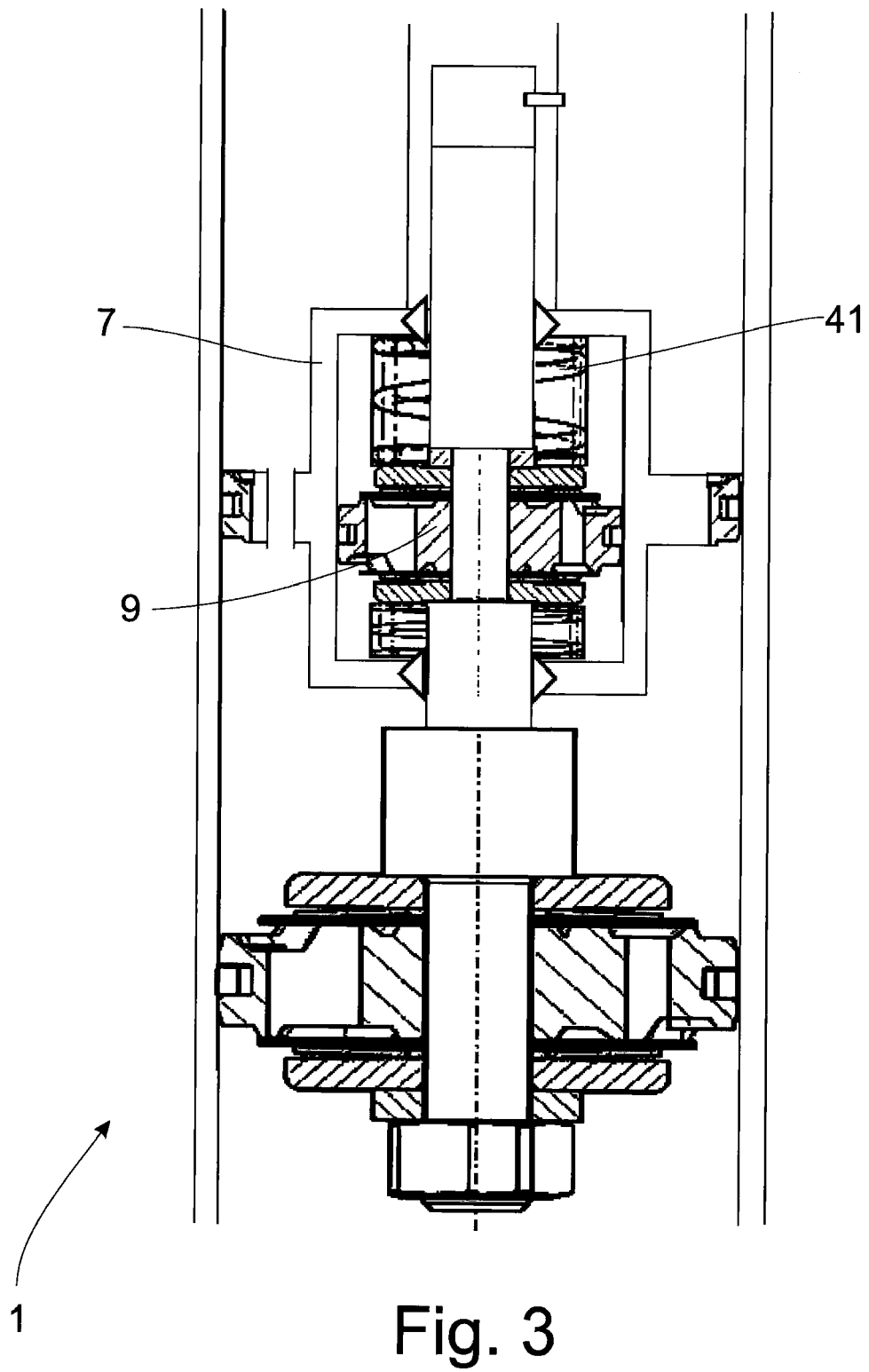
FIG. 3 is a variant of FIG. 1 with impact spring.

Alternatively, as is shown in FIG. 3, the impact spring 41 can also be designed for a larger deflection and, e.g., preloads the auxiliary piston 9 to an initial position in the housing 7.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A vibration damper comprising:
    a cylinder (3);
    a piston rod (5) axially movable within said cylinder, said piston rod having a piston rod portion (19);
    a housing (7) arranged at said piston rod (5);
    an auxiliary piston (9) axially movably supported in said housing and connected to said piston rod portion (19); said piston rod (5) and said piston rod portion (19) movable in a first and second movement direction;
    a main piston (21) arranged at said piston rod portion (19); said auxiliary piston (9) and said main piston (21) comprising damping valves (15, 17, 23, 25) for generating a damping force for said first and second movement directions of said piston rod (5) and piston rod portion (19); said main piston (21) dividing said cylinder (3) into a first working chamber (27) on the piston rod side and a second working chamber (29) remote of said piston rod; said first and second working chambers filled with damping medium; said main piston generating a damping force; said auxiliary piston (9) dividing said housing (7) into a first and second auxiliary chamber; and wherein said auxiliary piston (9) has a stroke path and is constructed to generate a damping force over said entire stroke path, said damping force at all times being greater than said damping force of said main piston at an identical stroke;
    wherein said piston rod portion (19) comprises an extension (35) extending from said auxiliary piston (9) to an end limiting wall (31) of said auxiliary chamber (11) in every stroke position of the auxiliary piston (9); and
    wherein said auxiliary chamber (11) is adjoined by a receiving space (37) for a stroke path of said extension (35).

2. The vibration damper according to claim 1, wherein said auxiliary piston (9) and said main piston (21) exhibit a damping force characteristic having a qualitative behavior, and wherein said damping force characteristic of said auxiliary piston (9) shows the same qualitative behavior as said damping force characteristic of said main piston (21).

3. The vibration damper according to claim 1, wherein said receiving space (37) has a pressure compensation opening (39) at said first working chamber (27).

4. The vibration damper according to claim 1, additionally comprising an impact spring (41) associated with said auxiliary piston (9).

5. The vibration damper according to claim 4, wherein said impact spring (41) preloads said auxiliary piston (9) to an initial position in said housing (7).

* * * * *